March 8, 1960 K. H. LANGE 2,927,357
RELEASABLE FASTENER
Filed April 15, 1957
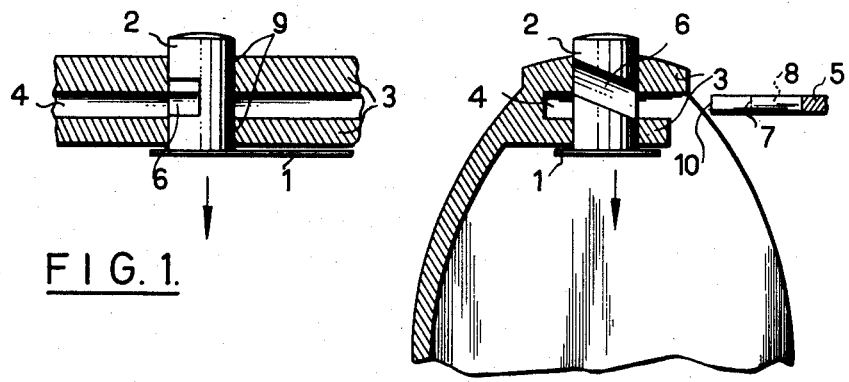
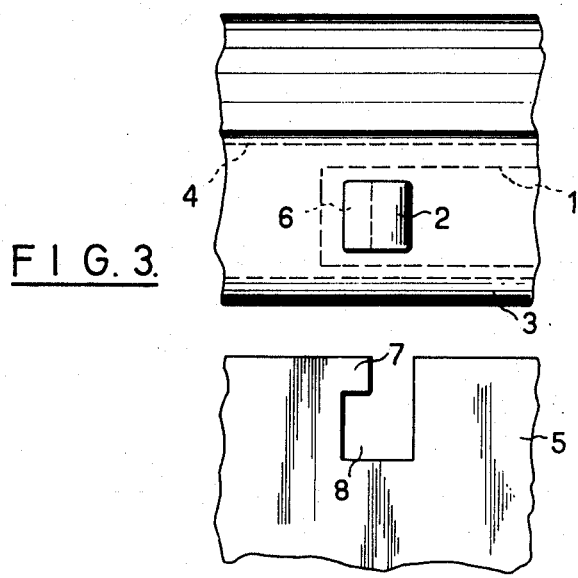
INVENTOR:
KARL HEINZ LANGE
By
Attorney

United States Patent Office 2,927,357
Patented Mar. 8, 1960

2,927,357

RELEASABLE FASTENER

Karl Heinz Lange, Bunde, Westphalia, Germany, assignor to Balda-Kamerawerk Rudolf Gruter K.G., Bunde, Westphalia, Germany, a German company Application April 15, 1957, Serial No. 652,862

Claims priority, application Germany April 18, 1956

6 Claims. (Cl. 24—230)

This invention relates to releasable fasteners of the type which are released by pressure on a press button, particularly, but not solely, to such fasteners which permit a light-tight connection between two members. The invention also relates to articles, of which cameras are an example, using such a fastener for connecting two parts, for example a camera body and lid, in a light-tight manner.

Many types of fasteners have been developed for cameras and the like requiring a light-tight connection between parts. Known fasteners have often required numerous parts and have therefore been expensive and have also often imposed limitations on the design of the camera body.

It is an object of the present invention to provide an improved releasable fastener.

It is a further object of the present invention to provide a light-tight connection between members engaged endwise and to provide simple means preventing accidental release.

It is a still further object of the invention to provide a releasable fastener for connecting two members adapted for movement into edgewise engagement with each other comprising a press-button or pin carried by one member, urged into a locking position by a resilient member and displaceable perpendicularly to the direction of engaging movement of the two members, said press-button having a transverse slot inclined to the said direction, the other member having a cut-away part for embracing the press-button, said cut-away part providing a hook part or tongue adapted to engage said inclined slot and displace the press-button as the members are moved into engagement and thereafter disengage the said inclined slot so that the press-button is released into the locking position.

Preferably, one of the members has two edges arranged to receive the edge of the other member between them and the press-button extends through holes in both of said two edges.

Preferably, also, the resilient member is a leaf spring arranged to cover any clearance between the press-button and the holes in the two edges.

In order that the invention may be readily carried into effect, one embodiment will now be particularly described, by way of example, with reference to the accompanying drawings, of which—

Figure 1 is a sectional view along a two-edged member showing the press-button of a releasable fastener in elevation;

Figure 2 is a view at right-angles to the view of Figure 1 showing a section through the two edges of the one member and through the edge of the member engaging therewith, again showing the press-button in elevation and Figure 3 is a plan view of the edge of the two members.

In the drawings, which show a part of a camera body and lid which are adapted for movement into edgewise engagement, the body part has two edges 3, which are spaced apart so as to provide a recess 4 to receive the edge 5 of the lid between them.

A press-button 2, which in this example is of square cross-section passes transversely of the body edges through a hole in each edge part 3. The press-button is mounted on the edge 3 of the body by a leaf spring 1, in a manner not shown. The leaf spring 1 urges the press button 2 upwards as seen in Figures 1 and 2, into the locking position.

By downward pressure, the press-button 2 may be moved axially in the direction of the arrows in Figures 1 and 2, against the action of the leaf spring 1.

The edge 5 of the lid can be moved into engagement with the body edges 3 from right to left as seen in Figure 2, that is, at right angles to the direction of movement of the press-button 2.

The edge 5 has a cut-away part 8 of sufficient width to embrace the press-button 2 as the lid is closed on the body.

The cut away part 8 provides a hook part or tongue 7 which, as the lid is being closed on the body, enters and engages a transverse slot 6 in the press-button 2 which is inclined to the direction of the engaging movement of the two parts. As the lid is further closed, the tongue 7 with front 10 depresses the press-button 2 until, when the lid is fully closed, the tongue 7 passes out of the slot 6. The press-button is thereby released and springs back to the locked position in which the tongue 7 is retained against the side of the press-button 2.

The leaf spring 1 is wider than the press-button 2 and extends beyond it so that it covers any clearance, as at 9 in Figure 1, between the press-button 2 and the holes in the edges 3.

The fastener is released by pressure on the press-button 2 which enables the tongue 7 to re-enter the slot 6. However, the lid is still held from opening by retention of the tongue 7 in the oblique slot 6. The lid is conveniently hinged and provided with an opening spring, not shown, so that it springs open as the press-button is released.

Further safety against opening of the lid by accidental pressure on the press-button 2 is provided by using two such fasteners, in which case the lid can be opened only by the simultaneous depression and release of both press-buttons.

I claim:

1. In combination, a pair of wall members to be releasably secured in edge-to-edge relation, one of said wall members being formed with a recess extending inwardly from its edge for receiving an edge of the other wall member, said other wall member being formed with a cutout extending inwardly from the edge thereof through a relatively narrow portion and opening therefrom into an enlarged portion to define a tongue located between the edge of said other wall member and said enlarged cutout portion, a pin extending through said one wall member slidable longitudinally therein and passing through said recess, resilient means urging said pin toward one extreme position of its sliding movement in one direction, said pin being formed with an open-ended slot extending in the direction toward and away from the edge of said one wall member and of a depth sufficient to receive said tongue with the remainder of said pin being received in said relatively narrow portion when the edge of said other wall member is inserted into said recess, said slot being disposed at an oblique angle with respect to said pin, said slot having one end adjacent to the edge of said one wall member opening into said recess when said pin is in said one extreme position and extending obliquely toward its opposite end in said one direction whereby the edge of said other wall member is insertable into said recess with said tongue engaging in said one end of said slot, continued insertion of said other wall member serving to shift said pin in its opposite direction of movement against the force of said resilient means until said tongue is beyond said slot to permit the return of said pin to said one extreme position for retaining said tongue and said other wall member in its inserted condition.

2. The combination according to claim 1, said pin extending at one end beyond said one wall member to define a manually actuable button.

3. The combination according to claim 1, said resilient means comprising a leaf spring having its opposite ends respectively connected to said pin and said one wall member.

4. The combination according to claim 1, said slot being disposed at an oblique angle with respect to said pin such that the opposite slot end is substantially out of said recess when said pin is in one said extreme position, whereby said pin with its side wall part opposite to the edge of said one wall member substantially closes the cross section of said recess and actually locks the said other wall member in said one extreme position.

5. The combination according to claim 1, said pin extending at one end beyond said one wall member to define a manually actuable button, and said resilient means comprising a leaf spring having its opposite ends respectively connected to the other end of said pin and said one wall member.

6. The combination according to claim 5, said slot being disposed at an oblique angle with respect to said pin such that the opposite slot end is substantially out of said recess when said pin is in one said extreme position, whereby said pin substantially closes said recess in said one extreme position.

References Cited in the file of this patent

UNITED STATES PATENTS

| | | |
|---|---|---|
| 1,536,193 | Deuscher | May 5, 1925 |
| 2,174,518 | Kors | Oct. 3, 1939 |